Jan. 14, 1930.   N. E. WAHLBERG   1,743,642
BRAKE EQUALIZER
Filed July 5, 1924    2 Sheets-Sheet 2
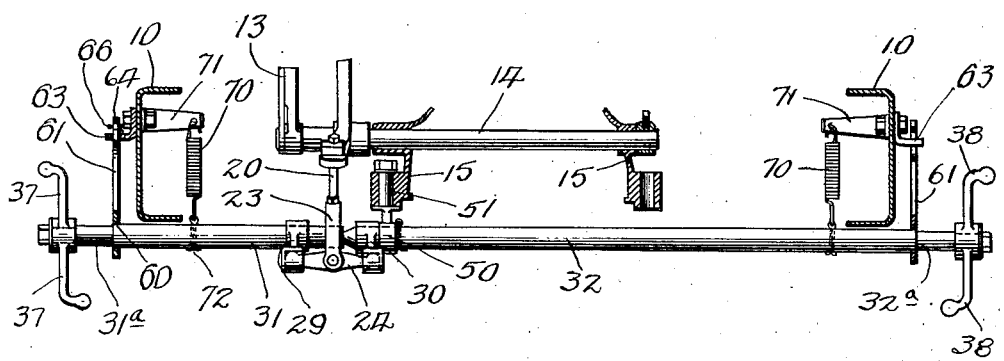
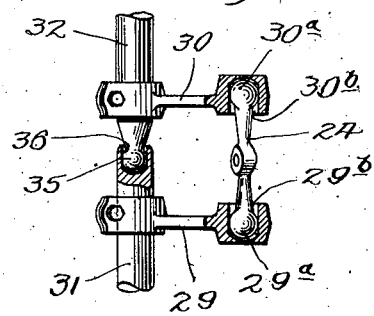
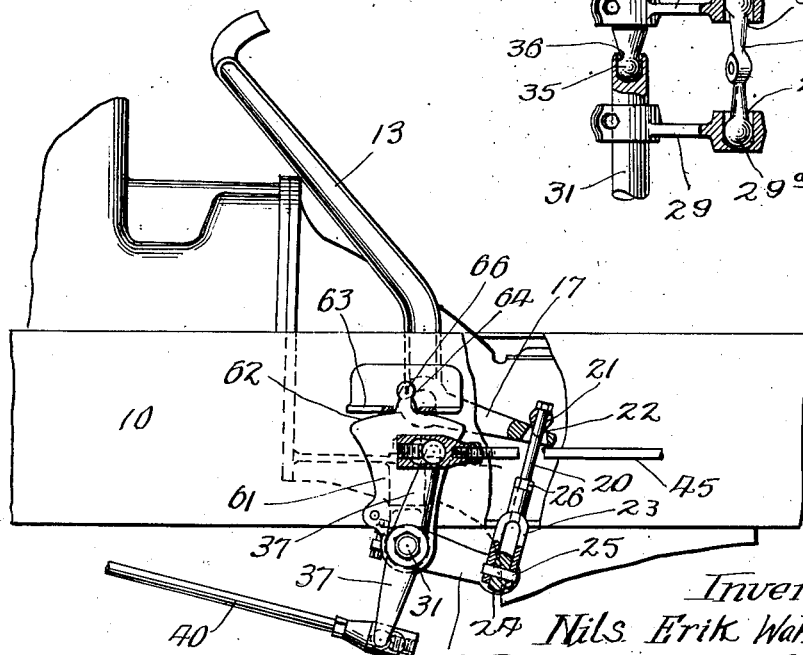

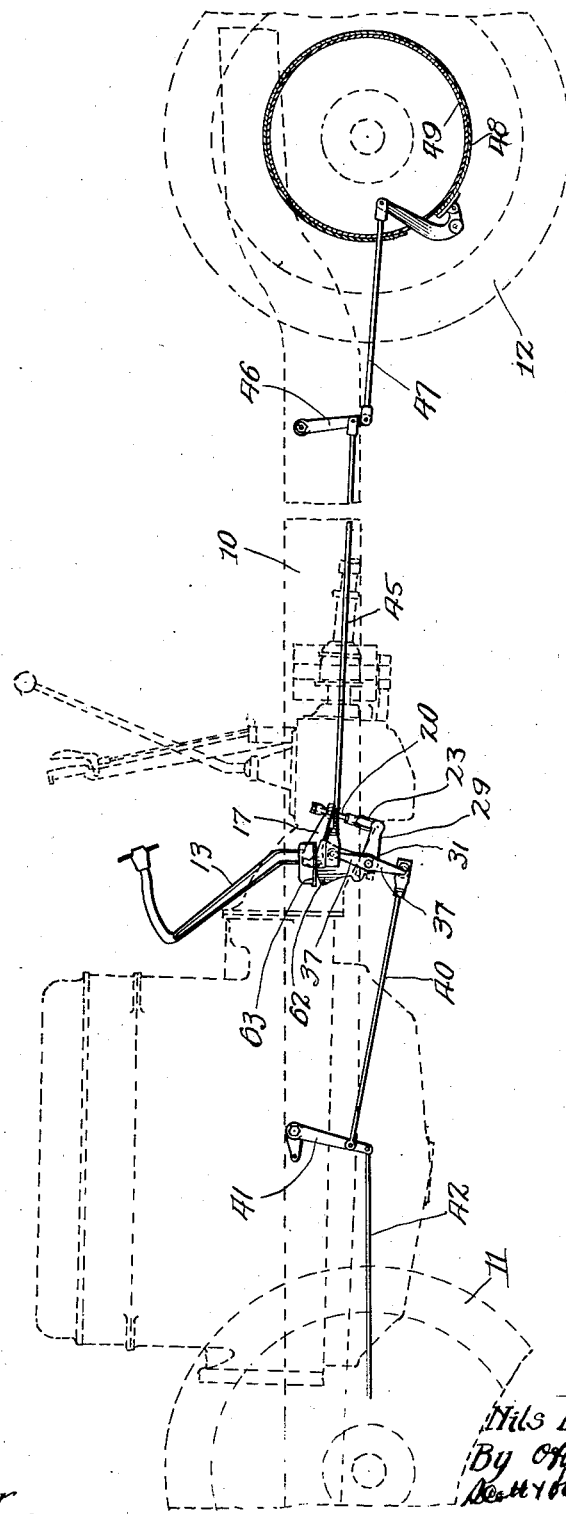

Patented Jan. 14, 1930

1,743,642

UNITED STATES PATENT OFFICE

NILS ERIK WAHLBERG, OF KENOSHA, WISCONSIN, ASSIGNOR TO NASH MOTORS COMPANY, OF KENOSHA, WISCONSIN, A CORPORATION OF MARYLAND

BRAKE EQUALIZER

Application filed July 5, 1924. Serial No. 724,220.

This invention relates to brake equalizers for vehicles, and more particularly to equalizers for automobile vehicles in which both front and rear wheels are provided with brakes operated by a single member, such as a foot pedal.

The principal object of the invention is to provide a simple and dependable equalizing mechanism for vehicles of the class described in which the braking pressures upon the four wheels may be equalized. Other objects of invention will appear from time to time as the description proceeds.

The invention may best be understood by reference to the accompanying drawings, in which Fig. 1 is a side view of a brake equalizing system constructed in accordance with my invention, and showing its application to an automobile.

Fig. 2 is an enlarged transverse sectional view of the machine frame with parts omitted.

Fig. 3 is an enlarged side view of a fragmentary portion of the machine frame, with parts broken away to show part of the lever connections.

Fig. 4 is a detail of the equalizing levers.

Referring now to details shown in the drawings, which illustrate one form in which my invention may be embodied, Fig. 1 shows an automobile chassis in dotted lines, including side frame members 10, front wheel 11 and rear wheel 12. Carried on the frame is a brake pedal 13 which may be of any suitable form, fixed on a pedal shaft 14. As shown herein, the pedal shaft is journalled on a pair of supports 15, 15 forming part of the machine frame.

The brake pedal 13 has an arm 17 rigid therewith, herein shown as extending rearwardly and having a link 20 connected thereto by a wedge member 21 working in a seat 22 in the usual manner (see Fig. 3). The lower end of the link is provided with a yoke 23 embracing an equalizing bar 24 and pivotally connected at the center thereof by a pin 25. The yoke 23 may be adjusted longitudinally of the link by the usual threaded connection including a lock nut 26.

The equalizing bar 24 has movable connection with a pair of lever arms 29 and 30 extending rearwardly from shafts 31 and 32. Said movable connection between the equalizing bar and the levers 29 and 30 preferably consists of ball and socket connections in which balls 29ª and 30ª engage respectively in sockets 29ᵇ and 30ᵇ formed in the ends of the respective levers 29 and 30.

The shafts 31 and 32 are adapted normally to be maintained in substantially axial alignment but the ends of said shafts are movably connected by suitable means, so that during operation of the mechanism a certain amount of relative movement is permitted between said shafts, as will hereinafter appear. The movable connection herein comprises a ball 35 on the end of shaft 32, which engages in coacting socket 36 in the end of shaft 31 (see Fig. 4). The shaft 31 extends to one side of the chassis frame where it is provided with a pair of lever arms 37, 37 while the other shaft 32 extends to the other side of the frame and is provided with a similar pair of lever arms 38, 38. The front and rear brakes are operatively connected to these lever arms, each of the front pair of brakes being connected by brake rod 40, intermediate lever 41 and brake rod 42, while each of the rear pair of brakes are similarly connected by brake rod 45, intermediate levers 46 and brake rod 47.

The brake mechanisms may be of the usual construction, as shown herein, the rear brakes comprising exterior brake band 48 on brake drum 49. The front brake is not shown, as it forms no part of the present invention, it being understood that it may comprise any form of brake with operative connections permitting the wheels to be steered in the usual manner.

The intermediate levers 41 and 46 are provided to regulate the ratio of pressure transmitted to the front and rear brakes, permitting the front wheels to rotate more freely than the rear wheels when the brakes are applied because it is well known that the steering action of the front wheels is more effective when the wheels are rolling than when rotation is retarded so that the wheels slip or skid in their contact with the ground.

Accordingly, the brake rod 40 is connected relatively nearer the fulcrum of the lever 41 than the point of connection of rod 45 or lever 46, thus transmitting more power to the rear wheel brakes than the front wheel brakes, although the tension on the inner rods 40 and 45 is substantially equal. Obviously, the ratio of pressures delivered on the front and rear brakes may be varied as desired by changing the lengths of the lever arms.

Referring now more particularly to the features of novelty of my invention by which the tensions on the rods 40 and 45 may be equalized, it will be observed that the shafts 31 and 32 have floating or moving support on the vehicle frame by means of the following devices: One of the shafts 32 has bearing in a sleeve 50 carried on a shank 51, which is supported for rotation on a substantially vertical axis in one of the frame members 15. The supporting sleeve 50 is close to the ball and socket connection between shafts 31 and 32, as shown in Fig. 2. This construction permits freedom of movement of the outer ends of said shafts in a substantially horizontal plane. These outer ends 31a and 32a are also supported for limited horizontal movement on the frame, the supporting devices herein shown being similar for both shafts, so the description of one device will be sufficient for the understanding of both. The outer end 31a of shaft 31, for instance, has bearing in an aperture 60 in the lower portion of a rocking plate 61. The upper portion of this plate is provided with a curved bearing surface 62 having engagement on a flanged bracket 63 secured on the adjacent side frame member 10. A projection 64 on said plate extends through an aperture 65 in the flanged bracket and is provided with a pin 66 so as to secure the parts together in case the other supporting devices should fail. The rocking plate is maintained in bearing engagement with flange 63 by suitable means such as a spring 70, which may be suspended from a bracket 71 on the interior of the side frame member 10 and secured to the shaft 31 by a cotter pin 72 or its equivalent. Under some conditions the spring 70 or its equivalent may be dispensed with, as for instance, in the arrangement of parts illustrated, the brake rods 40 and 45 are usually under constant tension of spring devices of their respective brake mechanisms, tending to render said brakes inoperative until actuated. In the arrangement of brake rods shown herein, it will be observed that the rods 40 and 45 are connected to levers 41 and 46 at points above the shaft 31, so that the resultant tension operating through said rods from their respective brake mechanisms as described will tend to maintain the rocking plate 61 in engagement with the flange 63.

The operation of the mechanism above described will now be understood. The shafts 31 and 32 are free to move horizontally so as to equalize the tension on the brake rods 40 and 45, while the equalizing bar in turn equalizes the torsion on the shafts 31 and 32, thus providing a system in which the four brake rods 40, 40, 45 and 45 are equalized with respect to each other.

While I have illustrated and described one particular embodiment of my invention, it will be understood that I do not wish to be limited to the exact construction shown and described, but that various changes and modifications may be made without departing from the spirit and scope of my invention.

I claim as my invention:

1. In a device of the class described, a vehicle frame having front and rear wheels and brake mechanisms therefor, a brake operating lever, a pair of shafts extending transversely of the frame and supported thereon for limited horizontal movement independent of each other, an equalizer bar operatively connected between said operating lever and both of said shafts for equalizing torsion thereon, levers on opposite sides of said shafts, and brake rods extending forwardly and rearwardly respectively from said last named levers and operatively connected with the front and rear wheel brake mechanisms.

2. In a device of the class described, a vehicle frame having front and rear wheels and brake mechanisms therefor, a pair of shafts extending transversely of the frame and movably connected to each other at abutting ends, supporting means permitting independent horizontal swinging movement of said shafts, means at the outer ends of said shafts operatively connected with the front and rear brake mechanisms on adjacent sides of said frame, and actuating means including an equalizer bar operatively connected with said shafts for equalizing the torsion thereof.

3. In a device of the class described, a vehicle frame having front and rear wheels and brake mechanisms therefor, a pair of shafts extending transversely of the frame and movably connected to each other at abutting ends, supporting means at the outer ends of each of said shafts each comprising a plate having horizontal rocking engagement on said frame and in which its respective shaft is journalled, means supporting said shaft and plate, means on the ends of said shafts operatively connected with the front and rear brake mechanisms on adjacent sides of said frame, and actuating means including an equalizer bar operatively connected with said shafts for equalizing the torsion thereof.

4. In a device of the character described, a vehicle frame having front and rear wheels and brake mechanisms therefor, a brake operating lever, a pair of shafts extending transversely of said frame and having a ball and socket connection at abutting ends intermediate the sides of said frame, a pair of levers connected to the adjacent ends of said shafts, an equalizer bar connected between said levers and said actuating lever for equalizing torsion on said shafts, a bracket supporting one of said shafts intermediate the sides of the frame and permitting pivotal movement thereof on a vertical axis, supporting means for the outer ends of said shafts permitting limited horizontal movement thereof, and means operatively connecting each of said outer ends with the front and rear brake mechanisms on adjacent sides of said frame.

5. In a device of the character described, a vehicle frame having front and rear wheels and brake mechanisms therefor, a brake operating lever, a pair of shafts extending transversely of said frame and having a ball and socket connection at abutting ends intermediate the sides of said frame, a pair of levers connected to the adjacent ends of said shafts, an equalizer bar connected between said levers and said actuating lever for equalizing torsion on said shafts, a bracket supporting one of said shafts intermediate the sides of the frame and permitting pivotal movement thereof on a vertical axis, supporting means for the outer ends of said shafts permitting limited horizontal movement thereof comprising a pair of plates in which said shafts are journalled, said plates having locking engagement on said frame, and means operatively connecting each of said outer ends with the front and rear brake mechanisms on adjacent sides of said frame.

6. In a device of the class described, a vehicle frame having front and rear wheels and brake mechanism therefor, a pair of shafts extending transversely of the frame, supporting means for said shafts permitting independent displacement of the outer ends thereof in direction transverse to their longitudinal axes, a brake operating lever, equalizing means affording operative connection between said brake operating lever and both of said shafts, and levers on the outer ends of said shafts extending in opposite directions therefrom and operatively connected with one pair of front and rear wheel brake mechanisms.

7. In a device of the class described, a vehicle frame having front and rear wheels and brake mechanisms therefor, a brake operating lever, a pair of shafts extending transversely of the frame, supporting means for said shaft permitting independent displacement of the outer ends thereof in direction transverse to their longitudinal axes, an equalizer bar operatively connected between said operating lever and the inner ends of said shafts, and levers on the outer ends of said shafts extending in opposite directions therefrom and operatively connected with a pair of front and rear wheel brake mechanisms.

8. In a device of the class described, a vehicle frame having front and rear wheels and brake mechanisms therefor, a pair of shafts extending transversely of the frame, supporting means permitting independent horizontal swinging movement of said shafts, means at the outer ends of said shafts operatively connected with the front and rear brake mechanisms on adjacent sides of said frame, and actuating means including an equalizer bar operatively connected with said shafts for equalizing the torsion thereof.

9. In a device of the class described, a vehicle frame having front and rear wheels and brake mechanisms therefor, a pair of shafts extending transversely of the frame, supporting means at the outer ends of each of said shafts each comprising a plate having horizontal rocking engagement on said frame and in which its respective shaft is journalled, means supporting said shaft and plate, means on the ends of said shafts operatively connected with the front and rear brake mechanisms on adjacent sides of said frame, and actuating means including an equalizer bar operatively connected with said shafts for equalizing the torsion thereof.

10. In a device of the character described, a vehicle frame having front and rear wheels and brake mechanisms therefor, a brake operating lever, a pair of shafts extending transversely of said frame, a pair of levers connected to the adjacent ends of said shafts, an equalizer bar connected between said levers and said actuating lever for equalizing torsion on said shafts, a bracket supporting one of said shafts intermediate the sides of the frame and permitting pivotal movement thereof on a vertical axis, supporting means for the outer ends of said shafts permitting limited horizontal movement thereof comprising a pair of plates in which said shafts are journalled, said plates having locking engagement on said frame, and means operatively connecting each of said outer ends with the front and rear brake mechanisms on adjacent sides of said frame.

11. A vehicle having, in combination, a chassis frame, brakes, a rock shaft arranged crosswise of the vehicle below the frame, connections from the rock shaft for operating the brakes, a bracket on the frame above the end of the rock shaft, a support for the end of the rock shaft having a part extending through an opening in the bracket and having shoulders on opposite sides of said part engaging the bottom of the bracket, and a spring urging the rock shaft upwardly and holding the shoulders yieldingly against the bracket.

12. In a brake mechanism for a motor vehicle equipped with brakes on the front wheels and on the rear wheels, a lever for connecting each front wheel brake to the rear wheel brake on the corresponding side of the vehicle, each of said levers being mounted on a separate cross shaft swingable about a point in its axis, and means for applying equal pressure to each of said shafts for rotating the same to thereby actuate said brakes.

13. In a brake mechanism for a motor vehicle equipped with brakes on the front wheels and on the rear wheels, a lever connecting each front wheel brake to the rear wheel brake on the corresponding side of the vehicle, an individual cross shaft carrying each of said levers and supported to swing about a point adjacent the end thereof opposite said lever, equalizing means connecting said shafts, and means for applying pressure to said equalizing means to actuate said brakes.

14. In a brake mechanism for a motor vehicle provided with brakes on the front and rear wheels thereof, a double lever connecting each front wheel brake to the rear wheel brake on the corresponding side of the vehicle, each lever being mounted between its ends on an independent cross shaft freely swingable for limited movement about a point adjacent one end thereof, and means for applying equal rotative pressure on said shafts from a single source to actuate said brakes.

15. In a motor vehicle provided with brakes on the front wheels and rear wheels thereof, means for applying said brakes comprising a pair of rigid cross shafts one end of each of which is freely movable longitudinally of said vehicle, means connecting said freely movable end of each lever to the front wheel brake and rear wheel brake on the corresponding side of said vehicle, and equalizing means connecting said cross shafts and for causing rotation thereof.

16. In a brake mechanism for a motor vehicle provided with brakes on the front wheels and rear wheels thereof, a pair of cross shafts mounted between said front and rear wheels, each cross shaft being mounted adjacent one end thereof in a bearing allowing said shaft to swing thereabout and being supported adjacent its opposite end on a swinging link, means operatively connecting one end of each of said shafts with the front wheel brake and rear wheel brake on its respective side of the vehicle, and equalizing means operatively connecting the opposite ends of said shafts.

17. In a motor vehicle having brakes on all four wheels, two normally substantially axially coincident cross shafts the inner ends of which lie in adjacent relationship and each of which is provided with a lever at its inner end, an equalizer bar connecting said levers, and means for applying pressure to said bar, each shaft being provided with opposed levers adjacent its outer end, and means for connecting said opposed levers to said brakes, means for pivotally supporting the inner ends of said shafts, and means for swingably supporting the outer ends of said shafts.

18. In a brake mechanism for a motor vehicle equipped with front and rear wheel brakes, means for simultaneously applying said brakes comprising a pair of separate cross shafts supported in end-to-end relationship between the front and rear wheels of said vehicle, each of said cross shafts being mounted to swing forwardly and rearwardly about a point adjacent its outer end, means for positively supporting the inner ends of said shafts, levers on the outer ends of said shafts, means operatively connecting each lever with the front and rear wheel brakes on its respective side of the vehicle, levers on the inner ends of said shafts operatively connected together by an equalizing bar, and a connection from said equalizing bar to a brake operating means.

19. In a brake mechanism, a pair of brakes, a shaft between the brakes, a bearing supporting said shaft for axial rotation and pivotal movements and holding the shaft against all other movements with respect thereto, connections from said shaft to the brakes, and means for rotating the shaft to apply the brakes.

20. In a brake mechanism, a pair of brakes, a shaft between the brakes, a bearing supporting said shaft at one point for axial rotation and pivotal movements and holding the shaft against all other movements with respect thereto, connections from said shaft to the brakes, means supporting said shaft at another point and limiting said pivotal movements thereof to directions substantially in line with said connections, and means for rotating the shaft to apply the brakes.

21. In a brake mechanism, a supporting part, a pair of brakes, a shaft between the brakes, a ball and socket joint connecting one end of the shaft to said supporting part whereby said shaft is axially rotatable and pivotally movable, connections from said shaft to the brakes, and means for rotating the shaft to apply the brakes.

22. In a brake mechanism, a supporting part, a pair of brakes, a shaft between the brakes, a ball and socket joint connecting one end of the shaft to said supporting part whereby said shaft is axially rotatable and pivotally movable, connections from said shaft to the brakes, means limiting said pivotal movements of the shaft to directions substantially in line with said connections, and means for rotating the shaft to apply the brakes.

Signed at Kenosha, Wis., this 30th day of June, 1924.

NILS ERIK WAHLBERG.